ately 400 to 900 nanometers range which extends for approximate...

United States Patent [19]

Baker et al.

[11] Patent Number: 5,144,422
[45] Date of Patent: Sep. 1, 1992

[54] OPTIMAL TELEVISION IMAGING SYSTEM FOR GUIDED MISSILE

[75] Inventors: Leland R. Baker; Lewis J. Golden, both of Tucson, Ariz.

[73] Assignee: Hughes Aircraft Company, Los Angeles, Calif.

[21] Appl. No.: 720,054

[22] Filed: Jun. 24, 1991

[51] Int. Cl.$^5$ .............................................. H04N 7/18
[52] U.S. Cl. ..................................... 358/109; 358/81; 358/103
[58] Field of Search ............... 358/103, 109, 100, 110, 358/81, 113, 209, 225, 99; 359/359, 360, 885

[56] References Cited

U.S. PATENT DOCUMENTS

| | | | |
|---|---|---|---|
| 3,536,402 | 10/1970 | Aston | 359/885 X |
| 3,571,649 | 3/1971 | Bush, Jr. | 359/885 X |
| 4,814,868 | 3/1989 | James | 358/100 |
| 5,013,917 | 5/1991 | Ulich | 358/95 X |

*Primary Examiner*—Victor R. Kostak
*Attorney, Agent, or Firm*—R. M. Heald; C. D. Brown; W. K. Denson-Low

[57] ABSTRACT

A lens assembly (30) focusses an optical image of a field of view (20) forward of a guided missile (12) onto a photosensitive target layer (50) of a television camera tube (52). The target layer (50) includes sublayers of zinc selenide (ZnSe) and cadmium telluride (CdTe)/zinc telluride (ZnTe), and has a spectral sensitivity range which extends for approximately 400 to 900 nanometers. A red filter (68) is provided to attenuate wavelengths shorter than 600 nanometers in the optical image to increase target contrast by reducing blue scattered light created by Rayleigh and aerosol scattering. The lack of response of the camera tube (52) to wavelengths longer than 900 nanometers further increases target contrast by reducing background radiation from soil and vegetation. A motorized variable iris diaphragm (56) is provided in the lens assembly (30) to automatically adjust the intensity of the optical image such that the television tube (52) generates an electronic image with constant brightness although the brightness of the field of view (20) may vary considerably. The diaphragm (56) has a high attenuation range on the order of 800:1 to accommodate a wide image brightness range. A neutral density gradient filter (70) having an optical density which decreases radially from the center toward the periphery thereof is mounted adjacent to the iris diaphragm (56) to increase the dynamic range of the diaphragm assembly (56).

19 Claims, 10 Drawing Sheets

OPTIMAL TELEVISION IMAGING SYSTEM FOR GUIDED MISSILE

BACKGROUND OF THE INVENTION

1. Field of the Invention

The present invention relates to a television imaging system for a guided missile or the like which provides improved target contrast and guidance reliability.

2. Description of the Related Art

Air-to-ground missiles (AGMs) such as the Maverick missile utilize a television system for guiding the missile to a designated target. A television camera is mounted in the front of the missile and generates a composite video image of the field of view in front of the missile. This image is initially displayed on a cathode ray tube (CRT) in the aircraft cockpit. The pilot or weapons system operator positions crosshairs on the CRT over the designated target, initiates lock-on, and then presses a button to launch the missile. A guidance electronics system in the missile converts the composite video image from the television camera into a digital image, which is analyzed using a centroid tracking or other algorithm to automatically guide the missile to the target. Deviations of the missile flight path from the designated path to the target are detected, and error signals are generated which are applied to deflect movable flippers or fins which guide the missile back toward the designated path.

Television cameras used in AGMs have previously utilized a Vidicon ® camera tube which was initially manufactured in the late 1940s by RCA. The AGM variant Vidicon ® was originally manufactured by General Electric, and is presently manufactured by MPD, Inc. of Owensboro, Ky. The Vidicon ® tube has a photosensitive target layer onto which an optical image of the missile field of view is focussed by a lens assembly. The photosensitive layer is formed of antimony trisulfide ($Sb_2S_3$), and has a spectral sensitivity or wavelength range which is close to that of the human eye, extending from approximately 400 to 800 nanometers.

The Vidicon ® tube is described in a textbook entitled "TELEVISION ENGINEERING HANDBOOK", edited by K. Benson, McGraw Hill, 1985, section 11.4 entitled "Vidicon Type Camera Tubes", pp. 11.26-11.28. The Vidicon ® tube has characteristics which are far from ideal for guided missile applications, including low sensitivity, low gamma, restricted operating temperature range, high dark current, high image lag, and poor spectral response. The low sensitivity, low gamma and spectral response limitations of the Vidicon ® tube provide relatively low contrast between the target and background surroundings, resulting in low target tracking and missile guidance reliability. These drawbacks render the missile system unusable during approximately 40% of daylight hours in Northern European winters.

SUMMARY OF THE INVENTION

A television guided missile system according to the present invention includes a missile, a television camera mounted on the missile for generating an electronic image of a field of view forward of the missile, and a guidance unit mounted in the missile for generating guidance control signals for guiding the flight of the missile in response to the electronic image.

The television camera may be used for applications other than missile guidance, such as surveillance, where it is desired to provide high contrast between a particular object and the surrounding background. The television camera includes a lens assembly for focussing an optical image of the field of view onto a photosensitive target layer of an optoelectronic image transducer such as a camera tube. The preferred camera tube for use in the present missile system is the Newvicon ®, manufactured by the Philips Company, although other types of optoelectronic transducers such as charge-coupled-device (CCD) arrays or silicon target tubes may be used. The Newvicon ® tube is described in the above referenced "TELEVISION ENGINEERING HANDBOOK", section 11.4.6 entitled "Zinc Selenide Photo-conductor", pp. 11.32-11.33. The Newvicon ® tube has a photosensitive heterojunction target layer including sublayers of zinc selenide (ZnSe) and cadmium telluride (CdTe)/zinc telluride (ZnTe), with a spectral sensitivity range extending from approximately 400 to 900 nanometers. A red filter is provided to attenuate wavelengths in the optical image shorter than approximately 600 nanometers to increase target contrast by reducing blue background light created by Rayleigh and aerosol scattering. The lack of response of the camera tube to wavelengths longer than 900 nanometers further increases target contrast by reducing background radiation from soil and vegetation. The improvement in target contrast allows the guidance system to lock-on at longer ranges, thereby increasing the launch platform survivability.

A motorized variable iris diaphragm is provided in the lens assembly to automatically adjust the intensity of the optical image such that the television tube generates an electronic image with constant brightness although the brightness of the field of view may vary considerably. The diaphragm has a high attenuation range on the order of 800:1 to accommodate a wide image brightness range. A neutral density gradient filter having an optical density which decreases radially from the center toward the periphery thereof is mounted adjacent to the iris diaphragm to increase the dynamic range of the diaphragm assembly.

The increased spectral sensitivity of the Newvicon ® tube, which extends to approximately 900 nanometers as compared to the upper limit of approximately 800 nanometers for the prior art Vidicon ® tube, increases the response of the present system close to the near infrared portion of the spectrum, resulting in improved haze penetration and detection of camouflaged targets.

The missile performance is further improved by the higher sensitivity and increased operating temperature range of the Newvicon ® tube. Higher sensitivity allows all-day operation in Northern European winter with sun angles as low as −5° (slightly past sunset), operation with heavy cloud cover, and longer operating hours in desert environments.

These and other features and advantages of the present invention will be apparent to those skilled in the art from the following detailed description, taken together with the accompanying drawings, in which like reference numerals refer to like parts.

DETAILED DESCRIPTION OF THE INVENTION

Figure 1:
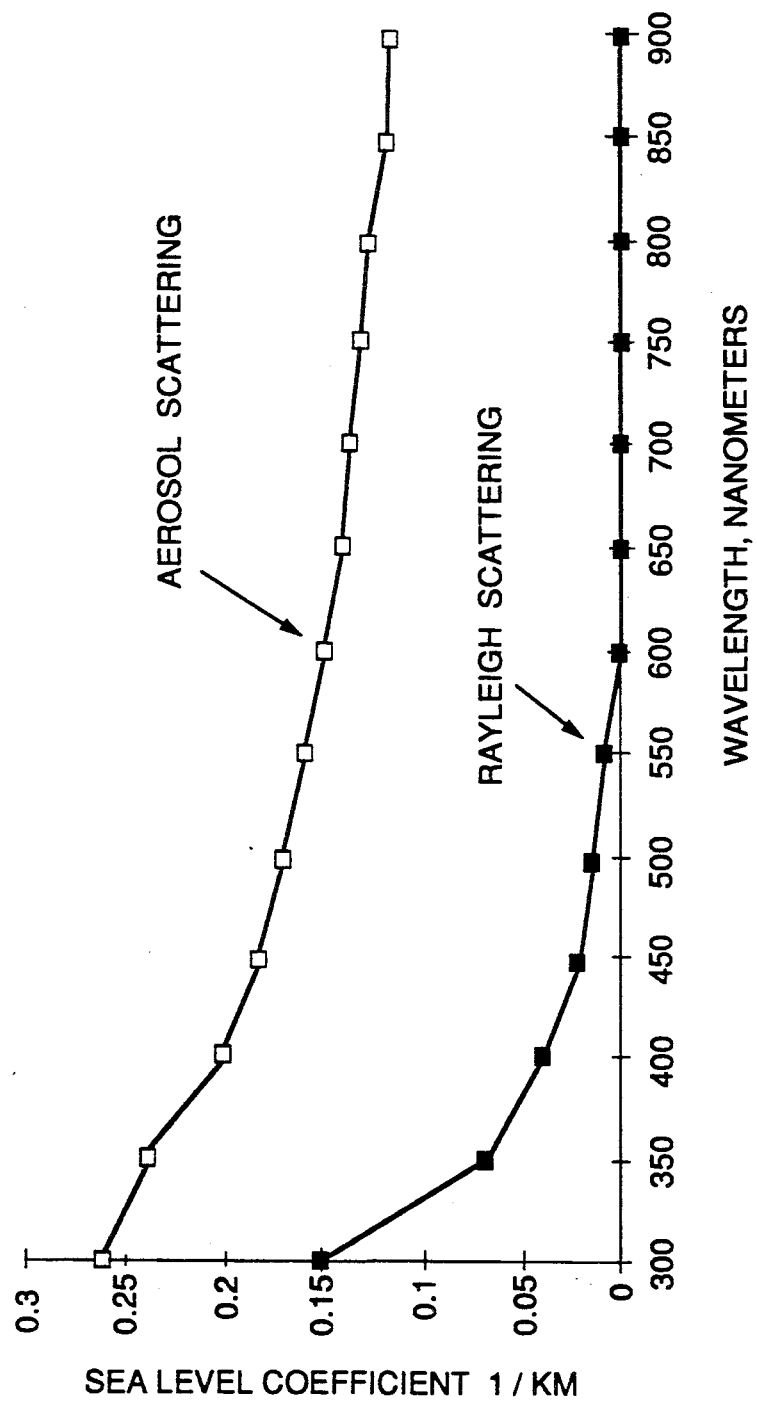
FIG. 1 is a graph illustrating the coefficient of attenuation of light at sea-level caused by Rayleigh and aerosol scattering.

FIG. 1 of the drawing illustrates the sea-level attenuation of light in the atmosphere caused by Rayleigh and aerosol scattering. These types of scattering create blue light which reduces the contrast between a target being tracked by a television guided missile and the background. It will be seen that the effects of Rayleigh scattering decrease to a negligible level at wavelengths longer than approximately 600 nanometers. The effects of aerosol scattering decrease relatively rapidly as the wavelength increases to approximately 600 nanometers, and decrease at a lower rate for longer wavelengths.

Figure 2:
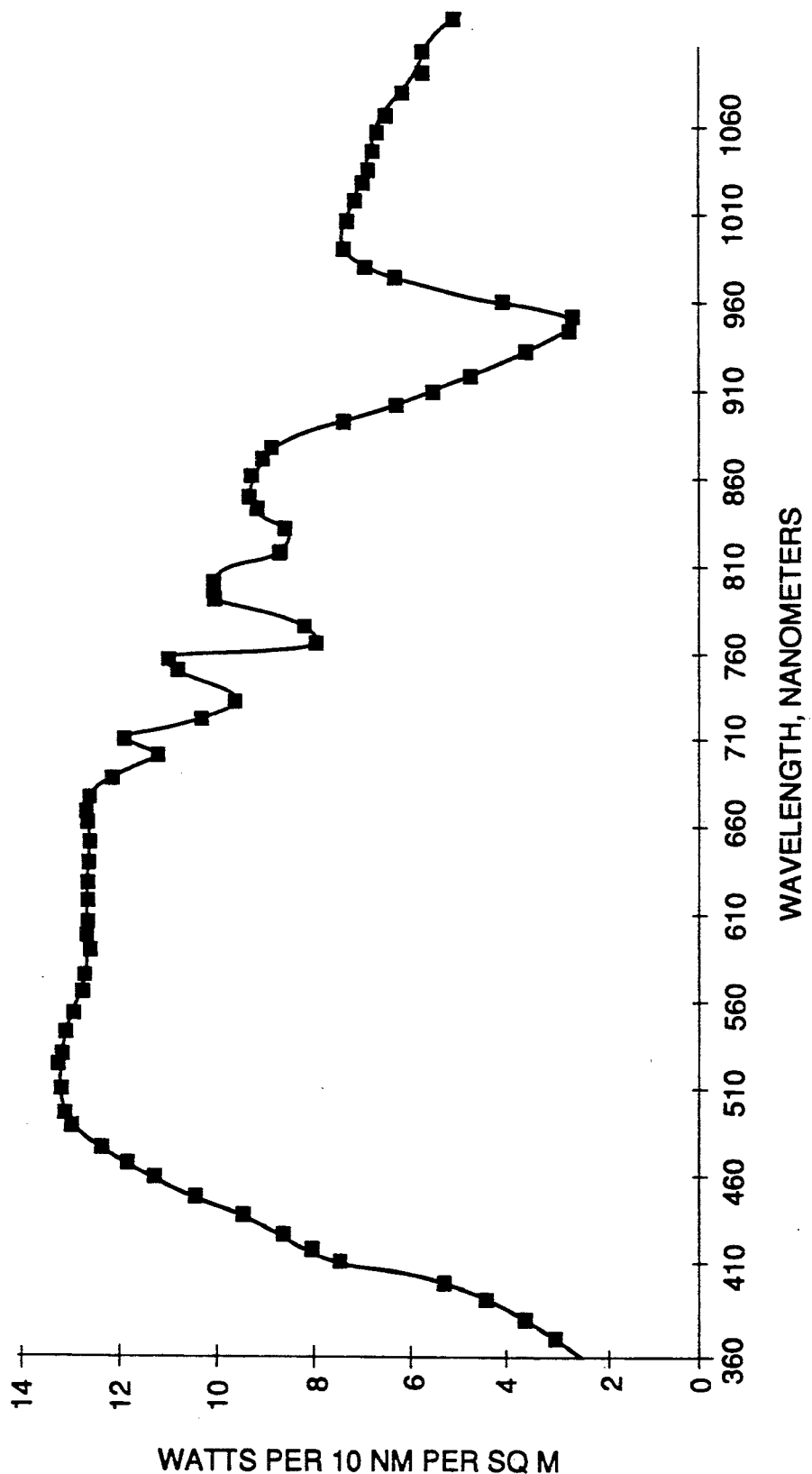
FIG. 2 is a graph illustrating the solar irradiance on a flat surface on a clear day through two air masses simulating the slant range-to-target through the atmosphere.

FIG. 2 illustrates the solar irradiance on a flat surface on a clear day through two air masses which simulate the slant range-to-target at an angle of 60° through the atmosphere. The curve dips sharply at approximately 920 nanometers due to absorption of light at these wavelengths by water vapor in the atmosphere. Although CCD or other types of camera tubes may have spectral sensitivities which extend to wavelengths on the order of approximately 1100 nanometers, the water vapor absorption band limits the usefulness of these devices above 920 nanometers.

Figure 3:
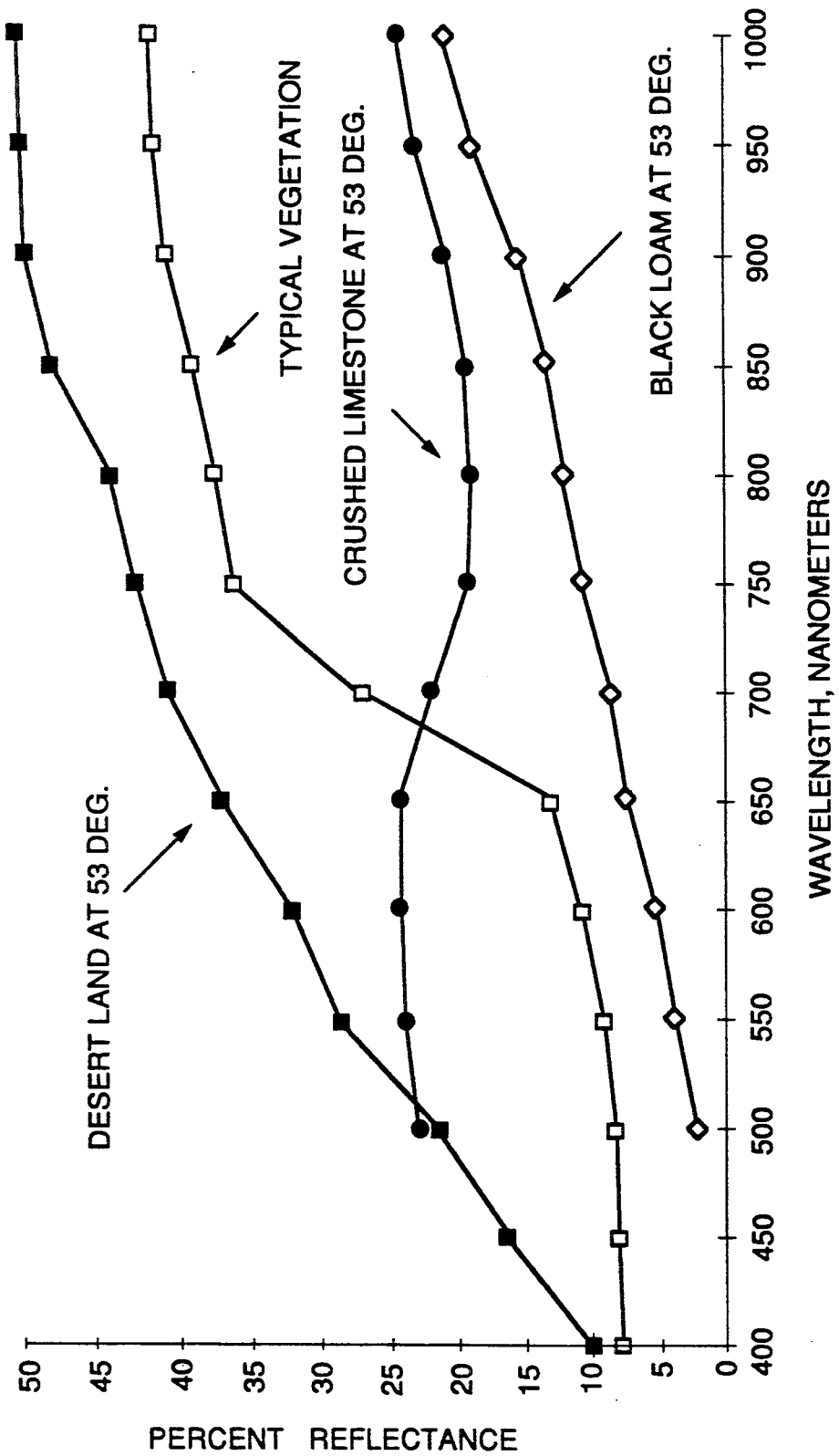
FIG. 3 is a graph illustrating the spectral variation of background radiation from soil and vegetation.

FIG. 3 illustrates the background radiation of various types of soil and vegetation expressed as percentage of reflectance. It will be seen that this radiation, which constitutes another component of the background of a target being tracked by a television guided missile, generally increases with wavelength.

Figure 4:
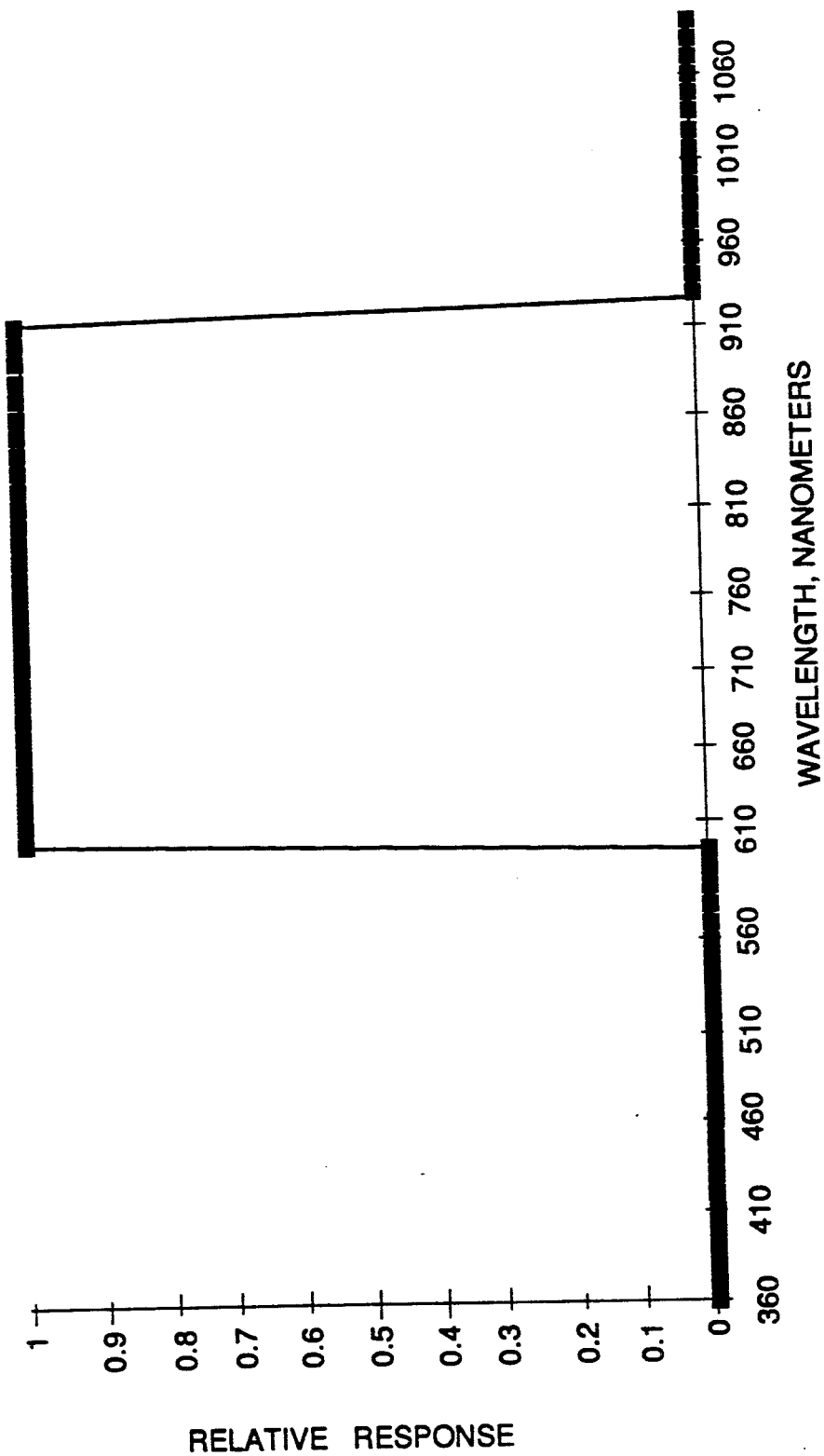
FIG. 4 is a graph illustrating the optimal spectral response of a television camera tube according to the present invention.

Based on the information represented by FIGS. 1 to 3, the optimal spectral sensitivity range for a television camera used for missile guidance which provides maximum contrast between the target and the background is illustrated in FIG. 4. The sensitivity is essentially zero for wavelengths shorter than approximately 600 nanometers, thereby completely eliminating the blue light caused by Rayleigh scattering and a large proportion of the blue light caused by aerosol scattering as shown in FIG. 1. The sensitivity is also essentially zero for wavelengths longer than approximately 900 nanometers, thereby eliminating the sharp decrease in solar irradiance caused by the water vapor absorption band as shown in FIG. 2, and the high values of background radiation from soil and vegetation shown in FIG. 3.

The optimal spectral sensitivity range for a television camera for missile guidance applications therefore has a maximum, constant value within a wavelength range of approximately 600 to 900 nanometers, and zero sensitivity outside this range as illustrated in FIG. 4.

Figure 5:
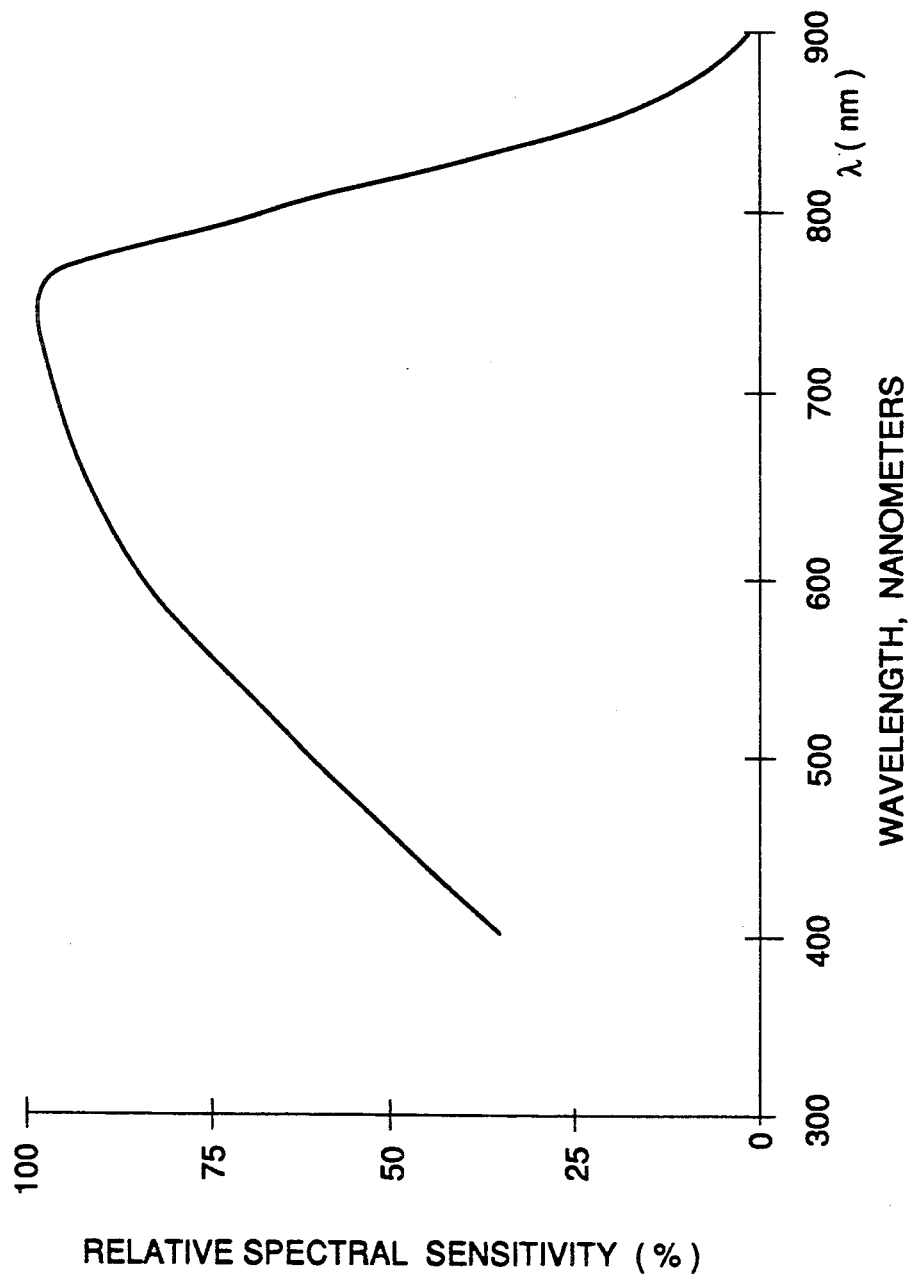
FIG. 5 is a graph illustrating the spectral response of a Newvicon ® tube for use in the present invention.

FIG. 5 illustrates the spectral sensitivity of the Newvicon ® camera tube without any filter. It will be seen that sensitivity ranges from approximately 400 to 900 nanometers. The upper wavelength limit is approximately equal to the optimal value of 900 nanometers. However, the sensitivity to wavelengths considerably shorter than 600 nanometers is undesirable, since it makes the camera tube sensitive to the blue light caused by Rayleigh and aerosol scattering as shown in FIG. 1.

Figure 6:
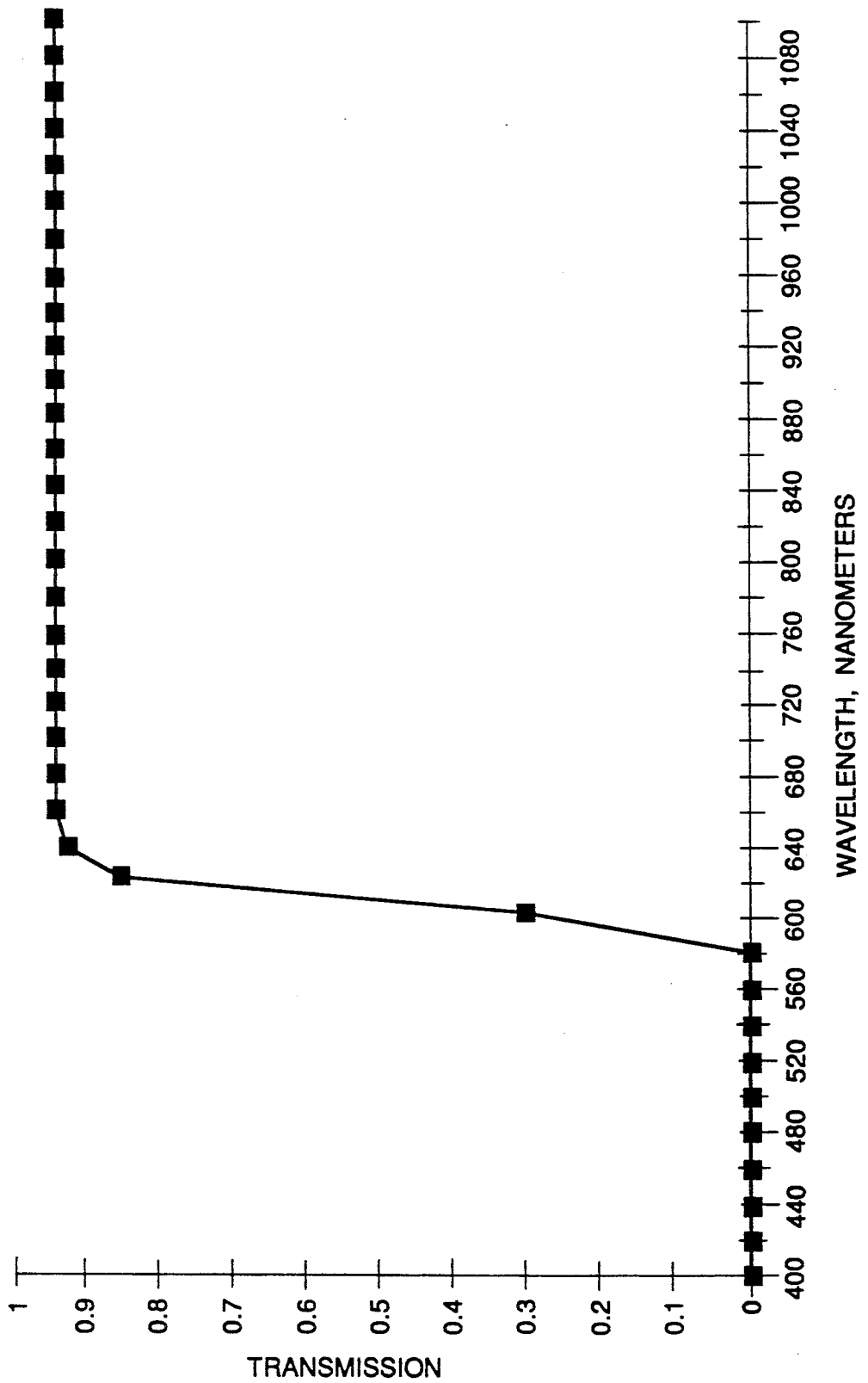
FIG. 6 is a graph illustrating the spectral transmission of a red filter for use with the Newvicon ® tube.

The spectral response of the Newvicon ® camera tube to wavelengths shorter than 600 nanometers is eliminated in accordance with the present invention by providing a red filter in a lens assembly which forms an optical image of the field of view forward of the missile. The spectral transmission of an ideal filter for this application is illustrated in FIG. 6. The filter transmits substantially 100% of the light passing therethrough of wavelengths longer than approximately 600 nanometers, and attenuates substantially 100% of the light of wavelengths shorter than 600 nanometers. Such filters are known as "sharp cut-on" filters, and are commercially available. A suitable filter for the practicing the present invention in combination with the Newvicon ® camera tube is manufactured by the Schott Glass Technologies, Inc., of Duryea, Pa., and designated as product no. RG610.

Figure 7:
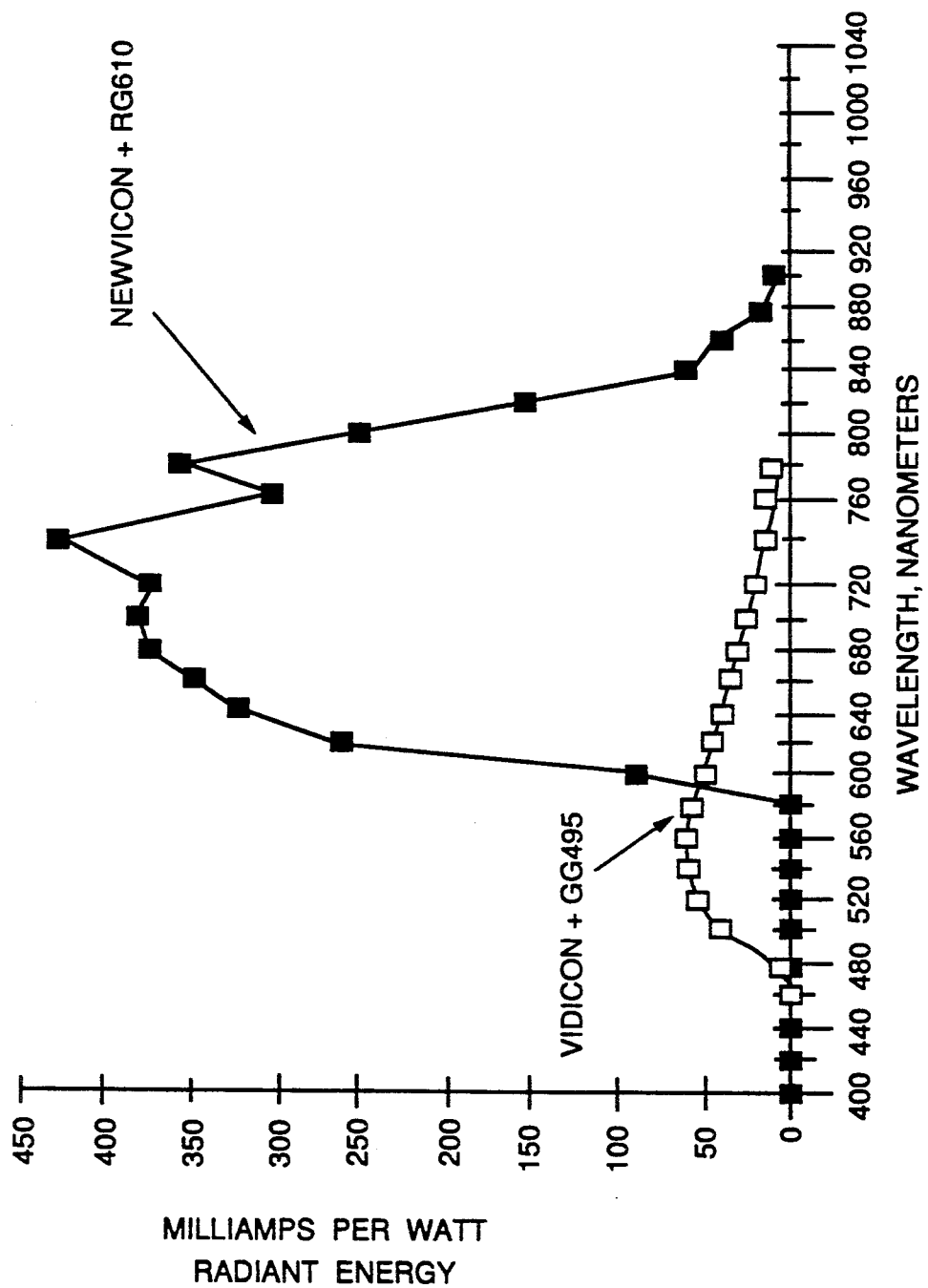
FIG. 7 is a graph illustrating the spectral response of the Newvicon ® tube with the red filter in comparison with a prior art Vidicon ® tube.

The spectral sensitivity of the Newvicon ® camera tube in combination with the Schott RG610 filter is illustrated in FIG. 7, and approximates the optimal range illustrated in FIG. 4. For comparison, the spectral sensitivity of the prior art Vidicon ® tube in combination with a yellow Schott GG495 filter is also shown in the drawing as extending within a much less desirable range of approximately 460 to 800 nanometers.

It will be understood that the scope of the present invention includes providing a television camera tube in combination with one or more optical filters, each having a predetermined spectral passband selected such that the camera tube generates image signals in response to a spectral portion of the optical image focussed on a photosensitive target layer thereof within a wavelength range of approximately 600 to 900 nanometers. In an application employing a camera tube having a spectral sensitivity range which extends to a wavelength considerably longer than 900 nanometers, an infrared filter (not shown) will be provided to attenuate wavelengths longer than approximately 900 nanometers.

Figure 8:
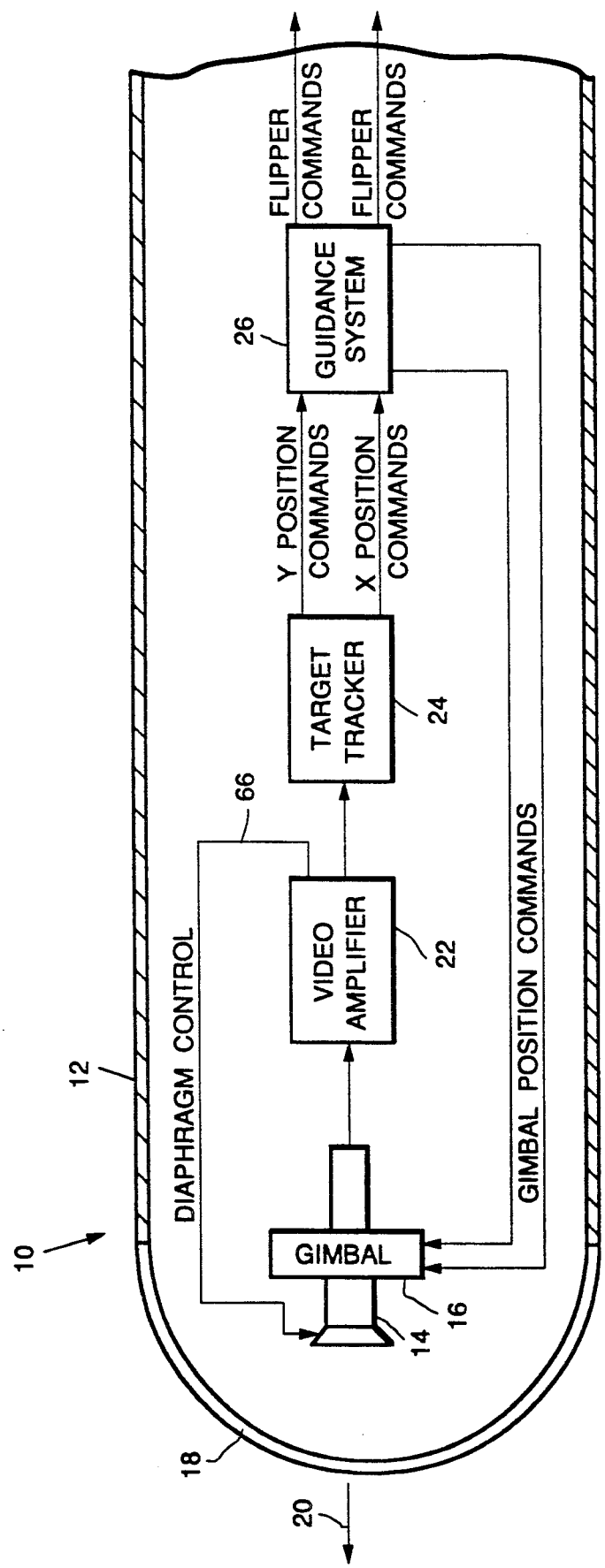
FIG. 8 is a simplified schematic diagram illustrating a guided missile system according to the present invention.

FIG. 8 illustrates a television guided missile system embodying the present invention which is generally designated as 10 and includes an air-to-ground missile (AGM) 12. A television camera assembly 14 is supported by gimbals 16 inside the missile 12 and aimed through a transparent dome 18 to generate electronic image signals corresponding to the field of view forward of the missile 12 as indicated at 20. The electronic image signals are fed from the camera assembly 14 to a video amplifier unit 22 which generates an electronic composite video signal or television image of the field of view 20.

The electronic image is applied to a target tracker unit 24 which analyzes the electronic image and generates X- and Y-position commands corresponding to the position of the target (not shown). A guidance system 26 generates guidance control signals in the form of flipper commands which are applied to deflect movable flippers or fins (not shown) for guiding the flight of the missile 12 to the target. The guidance system 26 also generates signals to position the gimbals 16 for proper target tracking.

Figure 9:
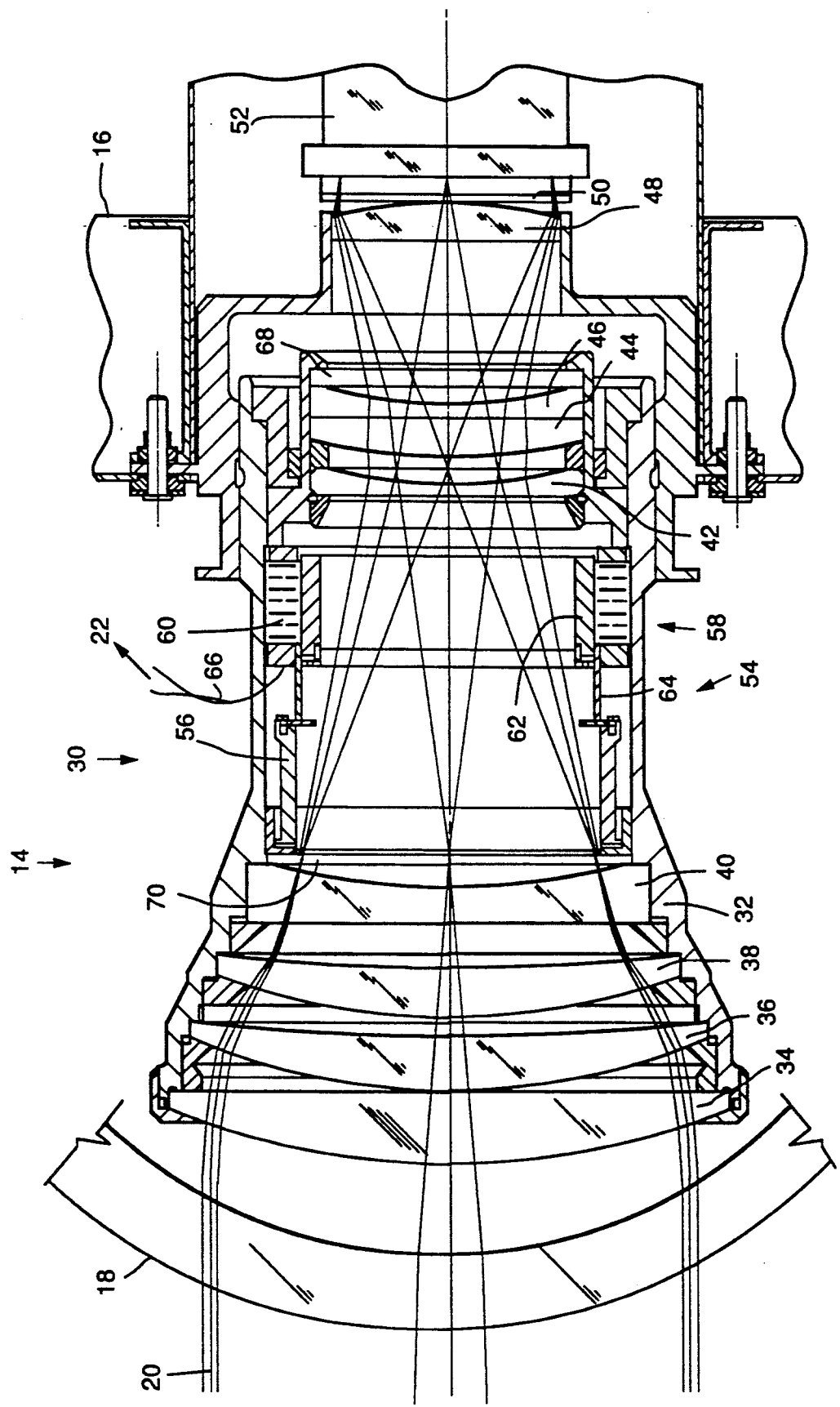
FIG. 9 is a sectional view illustrating a lens assembly of a television camera of the missile system.

As illustrated in FIG. 9, the television camera assembly 14 includes a lens assembly 30 having a generally cylindrical housing 32 in which are mounted a plurality of suitable lens elements 34, 36, 38, and 40 which constitute a front optics group, and lens elements 42, 44, 46 and 48 which constitute a rear optics group. The lens assembly 30 focusses an optical image of the field of view 20 onto a photosensitive target surface layer 50 of an optoelectronic image transducer such as a television camera tube 52. The tube 52 is preferably a Newvicon ® camera tube, although the invention is not so limited. Other types of optoelectronic image transducers, such as charge-coupled-device (CCD) arrays or silicon target tubes having the requisite spectral response may be employed.

The Newvicon ® camera tube does not permit automatic sensitivity control by regulating the signal electrode voltage as is possible with the prior art Vidicon ® tube. For this reason, an iris diaphragm assembly 54 is mounted in the housing 32 for adjusting the intensity of the optical image focussed on the camera tube 52 by the lens assembly 30. The diaphragm assembly 54 includes a multileaf variable iris diaphragm 56 and a cylindrical torque motor 58 for rotating the iris diaphragm 56 and thereby varying the aperture thereof. The torque motor 58 includes a stator 60, and a hollow cylindrical rotor 62 which is coaxially rotatable inside the stator 60 and connected to the iris diaphragm 56 by a hollow torque tube 64. The stator 60 includes an electrical winding (not designated) which is connected to receive electrical diaphragm control signals through wires 66 from the amplifier unit 22 to rotate the stator 62 and thereby vary the aperture of the iris diaphragm 56 in response thereto.

A red filter 68 having the spectral passband shown in FIG. 6 is mounted behind the lens 46 of the rear optics group to provide the television camera assembly 14 with the optimal spectral sensitivity as shown in FIG. 7. It will be noted that the location of the red filter 68 is not critical, and that the filter 68 may be mounted at any convenient point in the optical path of the lens assembly 30. A neutral density gradient filter 70 is mounted in the housing 32 closely adjacent to the front of the iris diaphragm 56 to increase the dynamic range of the diaphragm 56.

Figure 10:
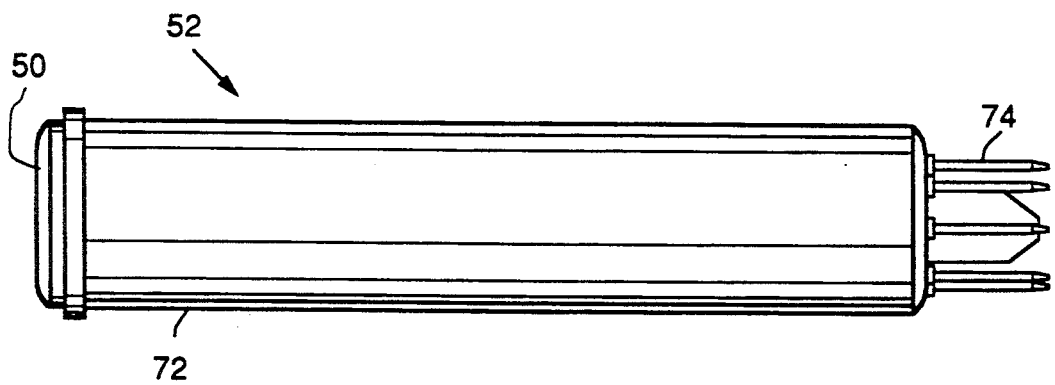
FIG. 10 is a side elevation of a camera tube of the television camera.

The Newvicon ® camera tube 52 is illustrated in FIG. 10, and includes an evacuated glass envelope 72. The photosensitive target layer 50 is formed on the inner surface of the faceplate (left end as viewed in the drawing) of the envelope 52, whereas pins 74 are provided at the rear (right) end of the envelope 72 to enable electrical connection of the camera tube 52 to the other units of the system. The target layer 50 includes sublayers of zinc selenide (ZnSe) and cadmium telluride (CdTe)/zinc telluride (ZnTe) which form a heterojunction, and has the spectral sensitivity range shown in FIG. 5. The red filter 68, which is preferably the Schott RG610 filter described above, is provided in combination with the Newvicon ® tube 52 such that the camera tube 52 in combination with the filter 68 has the spectral sensitivity range shown in FIG. 7.

Figure 11:
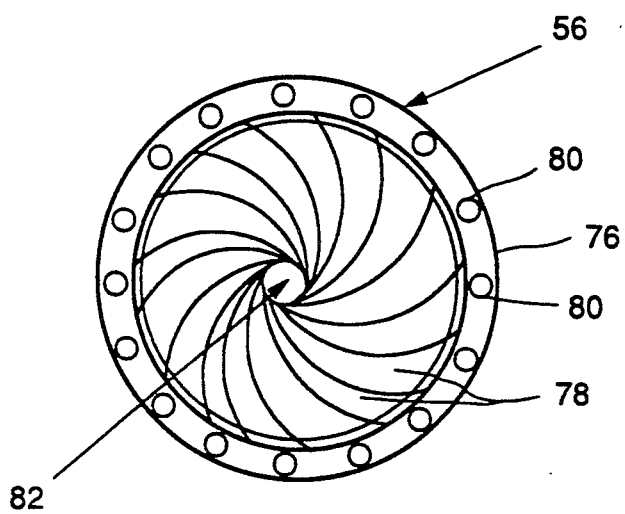
FIG. 11 is a front elevation of an iris diaphragm of the lens assembly.

The iris diaphragm 56 is illustrated in FIG. 11, and includes an outer ring 76 which is fitted inside the housing 32 of the lens assembly 30. A plurality of leaves 78 are pivotally attached at their radially outer ends to the ring 76 by pins 80. An internal mechanism (not shown) of conventional design is provided in the outer ring 76 and connected to the torque tube 64 such that rotation of the torque tube 64 causes the leaves 78 to pivot about their respective pins 80 and vary the diameter of an opening or aperture 82 of the diaphragm 56.

The video amplifier unit 22 generates the electrical diaphragm control signals which vary in accordance with the average amplitude of the electronic image signals from the television camera assembly 14. As the brightness of the field of view 20 increases, the amplitude of the electronic image signals increases. The video amplifier unit 22, in response, varies the electronic diaphragm control signals such that the torque motor 58 actuates the diaphragm 56 to decrease the aperture 82 thereof and reduce the luminous intensity of the optical image focussed by the lens assembly 30 onto the camera tube 52. This, in turn, causes the camera tube 52 to generate electronic image signals of lower amplitude. The opposite action occurs in response to a decrease in brightness of the field of view 20. The diaphragm control loop is designed such that composite video image generated by the television camera assembly 14 has constant brightness, although the brightness of the field of view 20 may vary over a large range.

In order to accommodate modern AGM scenarios, the diaphragm assembly 54 is designed to produce a constant intensity optical image over a range of scene luminance (brightness of field of view 20) within a range of 10,000 ftL to 1 ftL. This corresponds to an optical attenuation range of approximately 800:1. An iris diaphragm alone is capable of providing an attenuation range on the order of 22:1 without severe reduction in the modulation transfer function (MTF) caused by diffraction at extremely small values of the aperture 82. The gradient filter 70 is therefore provided to extend the attenuation range while maintaining the minimum diaphragm aperture 82 at a sufficiently large value that deleterious diffraction will not occur.

The diaphragm 56 preferably has sixteen to eighteen leaves 78, providing a sufficiently high ratio of clear aperture to outer diameter. Preferred values of maximum and minimum aperture 82 are 19 mm and 4 mm respectively.

Figure 12:
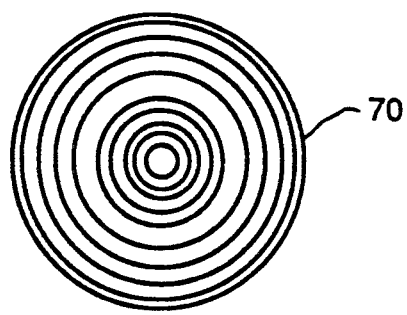
FIG. 12 is a front elevation of a neutral density gradient filter of the lens assembly.

The gradient filter 70 is illustrated in FIG. 12. The optical density of the filter 70 decreases in the radial direction from the center to the periphery thereof, preferably in a linear and continuous manner. The density gradient of the filter 70 is optimized to minimize insertion loss in conjunction with minimization of MTF loss, while providing the required 800:1 range of attenuation.

While an illustrative embodiment of the invention has been shown and described, numerous variations and alternate embodiments will occur to those skilled in the art, without departing from the spirit and scope of the invention as defined by the appended claims. For example, where a CCD array is used instead of the Newvicon ® camera tube, the iris diaphragm assembly will not be required, since CCD arrays may be provided with automatic intensity control. Accordingly, it is intended that the present invention not be limited solely to the specifically described illustrative embodiment.

We claim:

1. A television guided missile system, comprising:
   a missile;
   a television camera mounted on the missile for generating an electronic image of a field of view forward of the missile; and
   guidance means mounted in the missile for generating guidance control signals for guiding the flight of the missile in response to said electronic image;
   the television camera including:
   a lens assembly for forming an optical image of said field of view;
   optoelectronic image transducer means onto which said optical image is focussed by the lens assembly for generating electronic image signals corresponding to said optical image;
   signal processing means for generating said electronic image in response to said image signals; and
   optical filter means disposed in the optical path of the optical image and having a predetermined spectral passband selected such that the transducer means generates said image signals only in response to a spectral portion of said optical image within a wavelength range of approximately 600 to 900 nanometers.

2. A system as in claim 1, in which:
   the transducer means has a spectral sensitivity range which includes wavelengths considerably shorter than 600 nanometers; and
   the optical filter means is designed to sharply attenuate the spectral portion of the optical image which includes the wavelengths shorter than approximately 600 nanometers.

3. A system as in claim 1, in which:
   the lens assembly comprises a motorized iris diaphragm assembly for varying the intensity of the optical image; and
   the signal processing means comprises automatic diaphragm control means for sensing the amplitude of said image signals and adjusting the iris diaphragm assembly such that said amplitude is maintained at substantially a predetermined value.

4. A system as in claim 3, in which:
   the diaphragm control means generates electrical diaphragm control signals for controlling the iris diaphragm assembly; and
   the iris diaphragm assembly comprises:
   a variable iris diaphragm; and
   a cylindrical torque motor for adjusting the iris diaphragm in response to said diaphragm control signals.

5. A system as in claim 3, in which the iris diaphragm assembly comprises:
   a variable iris diaphragm; and
   a neutral density gradient filter having an optical density which decreases continuously from the center toward the periphery thereof.

6. A system as in claim 5, in which the optical density of the gradient filter decreases linearly from the center toward the periphery thereof.

7. A system as in claim 6, in which the iris diaphragm assembly has an optical attenuation range of at least approximately 800:1.

8. A system as in claim 1, in which the transducer means comprises a camera tube having a photosensitive target layer on which said optical image is focussed by the lens assembly, comprising sublayers of zinc selenide (ZnSe) and cadmium telluride (CdTe)/zinc telluride (ZnTe).

9. A system as in claim 8, in which:
   the camera tube has a spectral sensitivity range which extends from a wavelength considerably shorter than 600 nanometers to approximately 900 nanometers; and
   the optical filter means is designed to sharply attenuate the spectral portion of the optical image which includes the wavelengths shorter than approximately 600 nanometers.

10. A system as in claim 1, in which the missile is an air-to-ground guided missile (AGM).

11. A television camera assembly, comprising:
    optoelectronic image transducer means having a photosensitive target surface;
    said transducer comprising a camera tube having a target layer constituting said target surface, including sublayers of zinc selenide (ZnSe) and cadmium telluride (CdTe)/zinc telluride (ZnTe);
    a lens assembly for focussing an optical image on the target surface; and
    optical filter means disposed in the optical path of the optical image and having a predetermined spectral passband selected such that the transducer means generates electrical signals only in response to a spectral portion of said optical image within a wavelength range of approximately 600 to 900 nanometers.

12. A camera assembly as in claim 11, in which:
    the transducer means has a spectral sensitivity range which includes wavelengths considerably shorter than 600 nanometers; and
    the optical filter means is designed to sharply attenuate the spectral portion of the optical image which includes the wavelengths shorter than approximately 600 nanometers.

13. A camera assembly as in claim 11, in which:
    the camera tube has a spectral sensitivity range which extends from a wavelength considerably shorter than 600 nanometers to approximately 900 nanometers; and
    the optical filter means is designed to sharply attenuate the spectral portion of the optical image which includes the wavelengths shorter than approximately 600 nanometers.

14. A camera assembly as in claim 11, in which:
    the lens assembly comprises a motorized iris diaphragm assembly for varying the intensity of the optical image in response to applied electrical control signals.

15. A camera assembly as in claim 14, in which the iris diaphragm assembly comprises:
    a variable iris diaphragm; and
    a cylindrical torque motor for adjusting the iris diaphragm in response to said control signals.

16. A camera assembly as in claim 14, in which the iris diaphragm assembly comprises:
    a variable iris diaphragm; and
    a neutral density gradient filter having an optical density which decreases continuously from the center toward the periphery thereof.

17. A camera assembly as in claim 16, in which the optical density of the gradient filter decreases linearly from the center toward the periphery thereof.

18. A camera assembly as in claim 17, in which the iris diaphragm assembly has an optical attenuation range of at least approximately 800:1.

19. A television guided missile system, comprising:
a missile;
a television camera assembly mounted in the missile for generating an electronic image of a field of view forward of the missile;
said television camera assembly including:
optoelectronic image transducer means having a photosensitive target surface;
a camera tube having a spectral sensitivity range which extends from a wavelength considerably shorter than 600 nanometers to approximately 900 nanometers;
a lens assembly for focusing an optical image on the target surface; and
an optical filter disposed in an optical path of the optical image and having a predetermined spectral passband designed to sharply attenuate the spectral portion of the optical image which includes wavelengths shorter than approximately 600 nanometers;
whereby the transducer means generates electrical signals in response to a spectral portion of said optical image within a wavelength range of approximately 600 to 900 nanometers.

* * * * *